United States Patent [19]

Shiraishi et al.

[11] Patent Number: 4,921,578
[45] Date of Patent: May 1, 1990

[54] APPARATUS FOR REPRESENTING A LOAD TO BE CARRIED BY A DUMP TRUCK

[75] Inventors: Takao Shiraishi, Takasaki; Satoki Kondo, Fujisawa, both of Japan

[73] Assignee: Kabushiki Kaisha Komatsu Seisakusho, Tokyo, Japan

[21] Appl. No.: 361,072

[22] Filed: Jun. 5, 1989

[51] Int. Cl.⁵ .................... G01G 19/40; G01G 19/08
[52] U.S. Cl. ................................. 177/25.19; 177/136
[58] Field of Search ............................ 177/25.19, 136

[56] References Cited

U.S. PATENT DOCUMENTS

| | | | |
|---|---|---|---|
| 3,834,473 | 9/1974 | Girard et al. | 177/25.19 X |
| 3,980,871 | 9/1976 | Lindstrom et al. | 177/25.19 X |
| 4,588,038 | 5/1986 | Takagi . | |
| 4,635,739 | 1/1987 | Foley et al. . | |
| 4,691,792 | 9/1987 | Shintani . | |
| 4,835,719 | 5/1989 | Sorrells | 177/136 X |

Primary Examiner—George H. Miller, Jr.
Attorney, Agent, or Firm—Diller, Ramik & Wight

[57] ABSTRACT

As earth and sand are loaded on a dump truck by operating a loader, a quantity of load to be carried by the dump truck is stepwise increased at every time when a loading operation is performed. To assure that the load does not substantially exceed a rated load given to the dump truck, there is a need of estimating a load to be carried by the dump truck during a next loading operation. To this end, there is provided an apparatus for representing a load to be carried by the dump truck for which representing is effected on the basis of the load which has been measured using a load meter of the type mounted on the dump truck. The apparatus includes a calculating unit for calculating the number of loading operations by addition at every time when the load is stepwise increased so as to allow a load to be carried by the dump truck during a next loading operation to be estimated with reference to the number of loading operations and the load which has been loaded on the dump truck till now and a display unit for representing an estimative load to be carried by the dump truck, the estimative load being calculated using the calculating unit.

9 Claims, 4 Drawing Sheets

| 25 G | 26 G | 27 G | 28 Y | 29 R | $W_N$ | $W'_{N+1}$ |
|---|---|---|---|---|---|---|
| ◐ | ○ | ○ | ○ | ○ | $W_N < 60\%$ | $60\% \leq W'_{N+1} < 80\%$ |
| ● | ○ | ○ | ○ | ○ | $60\% \leq W_N < 80\%$ | $60\% \leq W'_{N+1} < 80\%$ |
| ● | ◐ | ○ | ○ | ○ | $60\% \leq W_N < 80\%$ | $80\% \leq W'_{N+1} < 100\%$ |
| ● | ● | ○ | ○ | ○ | $80\% \leq W_N < 100\%$ | $80\% \leq W'_{N+1} < 100\%$ |
| ● | ● | ◐ | ○ | ○ | $80\% \leq W_N < 100\%$ | $100\% \leq W'_{N+1} < 110\%$ |
| ● | ● | ● | ○ | ○ | $100\% \leq W_N < 110\%$ | $100\% \leq W'_{N+1} < 110\%$ |
| ● | ● | ● | ◐ | ○ | $100\% \leq W_N < 110\%$ | $110\% \leq W'_{N+1} < 120\%$ |
| ● | ● | ● | ● | ○ | $110\% \leq W_N < 120\%$ | $110\% \leq W'_{N+1} < 120\%$ |
| ● | ● | ● | ● | ◐ | $110\% \leq W_N < 120\%$ | $120\% \leq W'_{N+1}$ |
| ● | ● | ● | ● | ● | $120\% \leq W_N$ | $120\% \leq W'_{N+1}$ |

○ : LAMP OFF  $W_N$ : LOAD WEIGHT

◐ : LAMP FLICKERS  $W'_{N+1}$ : ESTIMATED LOAD WEIGHT

● : LAMP ON  % : RATIO TO RATED LOAD

FIG. 3

APPARATUS FOR REPRESENTING A LOAD TO BE CARRIED BY A DUMP TRUCK

BACKGROUND OF THE INVENTION

1. Technical Field

The present invention relates to an apparatus for representing a load to be carried by a dump truck for which the load is measured using a load meter of the type mounted on the dump truck.

2. Description of the Related Art

In recent years, a load meter of the type mounted on a dump truck (so-called payload meter) has been developed to measure a load to be carried by the dump truck (refer to an official gazette of Japanese Patent Application No. 155200/1984).

The load which has been measured using the load meter is represented, e.g., on a display board 202 disposed outside of the dump truck 201, as shown in FIG. 5. This assures that when earth and sand are loaded on the dump truck 201 by operating a loader 203, an operator can perform a loading operation while visually confirming the current load which has been represented on the display board 202.

The conventional display board 202 has a fashion of representing, e.g., as shown in FIG. 6. Specifically, the display board 202 includes five representation lamps 204 arranged in a side-by-side relationship. A division where each of the lamps 204 is placed is selectively determined in dependence on a ratio of load to be carried to rated load so that a certain lamp 204 corresponding to a load range less than the specified ratio of measured load to rated load is illuminated.

Although the fashion of representation provided by the conventional display board 202 as mentioned above assures that a quantity of load to be carried by the dump truck can visually be recognized, it is difficult for the display board 202 to make an estimation as to whether a quantity of earth and sand to be loaded during a next loading operation by operating the loader 203 coincides with the rated load of the dump truck 201 or exceeds the same.

SUMMARY OF THE INVENTION

The present invention has been made with the foregoing background in mind and its object resides in providing an apparatus for representing a load to be carried by a dump truck which makes it possible to estimate and represent a load to be carried by the dump truck during a next loading operation.

To accomplish the above object, the present invention provides an apparatus for representing a load to be carried by a dump truck for which representing is effected on the basis of the load which has been measured by a load meter of the type mounted on the dump truck, wherein the apparatus comprises calculating means for calculating the number of loading operations by addition at every time when the load is stepwise increased so as to allow a load to be carried by the dump truck during a next loading operation to be estimated with reference to the number of loading operations and the load which has been loaded on the dump truck till now, and representing means for representing an estimative load to be loaded on the dump truck, the estimative load being calculated by the calculating means.

In a preferred embodiment of the present invention, the calculating means is such that a steady value indicative of a load to be carried by the dump truck is measured on the basis of variation of the load, a determination is made such that the load is stepwise increased, on the basis of a difference between a steady value before a single loading operation and another steady value after the same, and the number of loading operations is calculated by addition at every time when the load is stepwise increased.

According to the present invention, a load to be carried by the dump truck which has been estimated by the calculating means is represented by operating the representing means. This makes it possible to properly control a quantity of load to be carried by the dump truck so as to allow it to exactly coincide with a rated load given to the dump truck.

Other objects, features and advantages of the present invention will become more readily apparent from reading of the following description which has been made with reference to the accompanying drawings.

BRIEF DESCRIPTION OF THE DRAWINGS

The present invention is illustrated in the following drawings in which:

FIG. 3 is a view for explaining a manner of representing on a display board which is used for the apparatus in FIG. 1.

DESCRIPTION OF THE PREFERRED EMBODIMENT

Now, the present invention will be described in detail hereinafter with reference to the accompanying drawings which illustrate a preferred embodiment thereof.

Figure 1:
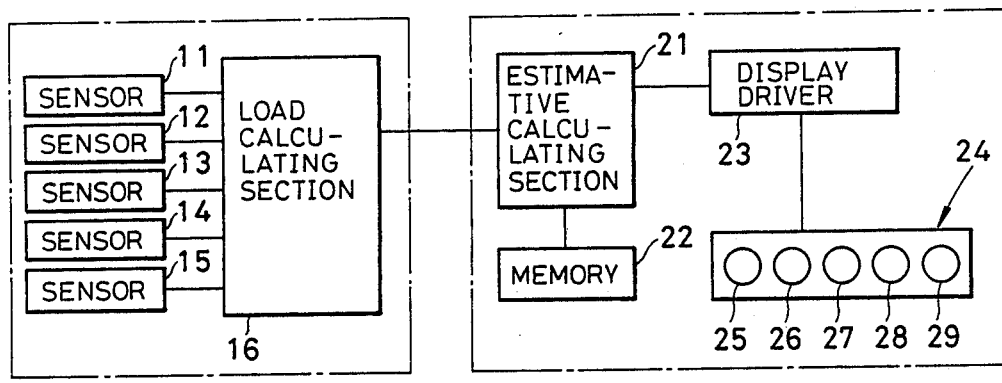
FIG. 1 is a block diagram schematically illustrating an apparatus for representing a quantity of load to be carried by a dump truck in accordance with an embodiment of the present invention.

FIG. 1 is a block diagram which schematically illustrate an apparatus for representing a load to be carried by a dump truck in accordance with an embodiment of the present invention. In the illustrated embodiment, the apparatus comprises a load meter 1 of the type mounted on a dump truck (not shown) to measure a quantity of load to be carried thereby and a display unit 2 for representing the measured load and and an estimative quantity of load to be carried thereby during a next loading operation. The load meter 1 includes pressure sensors 11, 12, 13 and 14 for detecting pressures exerted on front-left, front-right, rear-left and rear-right suspension cylinders on the dump truck, an inclination meter 15 for detecting an inclination angle of the dump truck as seen in the longitudinal direction thereof and a load calculation section for calculating a quantity of load to be carried by the dump truck with reference to detected outputs derived from the pressure sensors 11, 12, 13 and 14 and the inclination meter 15. After completion of a calculating operation for the load, the calculation section 16 transmits a signal representative of the load to an estimative calculation section 21 in the display unit 2.

Here, description will be made below as to a method of determining a quantity of load to be carried by a dump truck on the basis of pressures in the respective suspension cylinders and an inclination angle of the dump truck in the longitudinal direction. First, it is assumed that the respective pressure sensors serve to measure a hydraulic pressure $P_1$ in a top chamber provided above a piston in the suspension cylinder and a hydraulic pressure $P_2$ in a bottom chamber provided below the same, respectively. By putting the measured pressures $P_1$ and $P_2$ in the following formula (1), an axial force F exerted on the suspension cylinder can be obtained.

$$F = K \times (P_1 \times S_1 - P_2 \times S_2) \qquad (1)$$

where K is a constant, $S_1$ is a pressure receiving area in the top chamber and $S_2$ in a pressure receiving area in the bottom chamber.

In practice, axial forces $F_1$, $F_2$, $F_3$ and $F_4$ on the front-left, front-right, rear-left and rear-right suspension cylinders are obtained in accordance with the above formula (1) and the axial forces $F_1$, $F_2$, $F_3$ and $F_4$ on the suspension cylinders are then corrected with reference to the inclination angle of the dump truck so that corrected axial forces $F_1'$, $F_2'$, $F_3'$ and $F_4'$ are determined for them. Similarly, while the dump truck is held in an unloaded state, corrected axial forces $f_1'$, $f_2'$ $f_3'$ and $f_4'$ are previously measured so that a load in the unloaded state as represented by $W_i = f_1' + f_2' + f_3' + f_4'$ is determined by summing the aforementioned forces. Then, while the dump truck is held in a loaded state, corrected axial loads $F_1'$, $F_2'$, $F_3'$ and $F_4'$ are measured so that a load in the loaded state as represented by $W_s = F_1' + F_2' + F_3' + F_4'$ is determined by summing the aforementioned forces. Thus, a load W to be carried by the dump truck can be obtained by putting the loads $W_i$ and $W_s$ in the following formula (2).

$$W = W_s - W_i \qquad (2)$$

Figure 2:
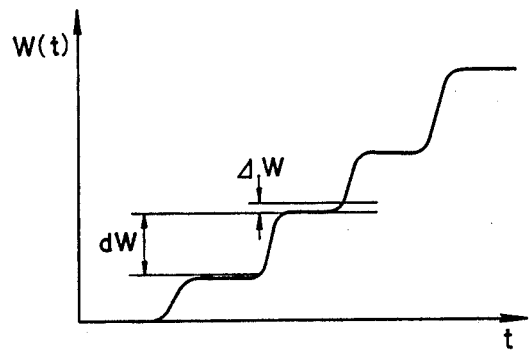
FIG. 2 is a graph illustrating a load on the dump truck, wherein the load is varied during loading operations.

As shown in FIG. 2, a load W(t) is stepwise increased during loading operations as time elapses. As is apparent from the drawing, the load W(t) is quickly increased during a loading operation but it is maintained at a level of steady value for a period of time other than the loading operation. Thus, when it is found that a quantity of variation of the load W(t) remains within the preset range of ΔW (e.g., 3% of a rated load) for a period of time longer than, e.g., 1 second after the calculation section 21 receives a signal representative of the load W(t) from the calculation section 16, a determination is determined such that the load W(t) is maintained at a level of steady value. Then, the steady value is stored in a storing section 22. Next, when the load W(t) is varied in excess of the quantity of ΔW and thereby the steady value is lost, the calculation section 21 is kept in a waiting state until another steady value is reached again. Once this steady value has been reached again, it is compared with the preceding steady value which has been stored in the storing section 22. When it is found that a differential load dW between both the steady values is in excess of, e.g., 10% of the rated load corresponding to a load handled by one operation of a loader, a determination is made such that one loading operation has been performed for handling a loaded weight dW.

However, in a case where a quantity of dW is less than 10%, this is considered as fluctuation in loading operation and the display unit 2 does not make a determination that a loading operation has been performed. Once it has been determined that one loading operation has been performed, the calculation section 21 calculates the number N of loading operations by addition, and the number N of loading operations and the loaded weight dW are stored in the storing section 22 together with a load $W_N$ to be carried by the dump truck which is representative of a steady value at this time.

Now, an average loaded weight $W_B$ can be obtained by putting the number N of loading operations and respective loaded weights dW in the following formula (3).

$$W_B = \frac{1}{N} \sum_N dW \qquad (3)$$

When the average loaded weight $W_B$ is added to the load $W_N$ representative of a steady value at this time, a load $W'_{N+1}$ to be carried by the dump truck during a next loading operation can be estimated in accordance with the following formula (4).

$$W'_{N+1} = W_N + W_B \qquad (4)$$

Then, the calculation section 21 calculates the above formulas (3) and (4) with reference to the number N of loading operations, the respective loaded weights dW corresponding to the number N of loading operations and the load $W_N$ representative of a steady value at this time each of which has been stored in the storing section 22 so as to allow the load $W'_{N+1}$ to be carried thereby during a next loading operation to be estimated. Then, the calculation section 21 delivers signals indicative of the estimated load $W'_{N+1}$ to be carried by the dump truck during a next loading operation and the load $W_N$ representative of a steady value at this time to a display driver 23.

When the display driver 23 has these signals inputted therein, a display board 24 disposed outside of the dump truck is activated in response to the estimated load $W'_{N+1}$ and the load $W_N$ to be carried by the dump truck at this time in such a manner as illustrated in FIG. 3. Specifically, in a case where the load $W_N$ to be carried thereby at this time is less than 60% of the rated load and the estimated load $W'_{N+1}$ is equal to or more than 60% of a rated load but less than 80% of the same, a green lamp 25 is turned on/off. Next, in a case where $W_N$ is equal to or more than 60% of the rated load but less than 80% of the same, the green lamp 25 is turned on. In addition, in a case where $W_N$ is equal to and more than 60% of the rated load but less than 80% of the same and $W'_{N+1}$ is equal to or more than 80% of the rated load but less than 100% of the same, the green lamp 25 is turned on and a green lamp 26 is additionally turned on/off. Further, as is apparent from the drawing, green lamps 25, 26 and 27, a yellow lamp 28 and a red lamp 29 are turned off, turned on and/or turned on/off under conditions as represented in the drawing with respect to the load $W_N$ to be carried by the dump truck at this time and the load $W'_{N+1}$ to be carried thereby during a next loading operation.

Consequently, the load $W_N$ to be carried by the dump truck at this time can visually be recognized by green lamp(s) which are tuned on and the load $W'_{N+1}$ to be carried during a next loading operation can visually be recognized by a lamp which is turned on/off.

Figure 4:
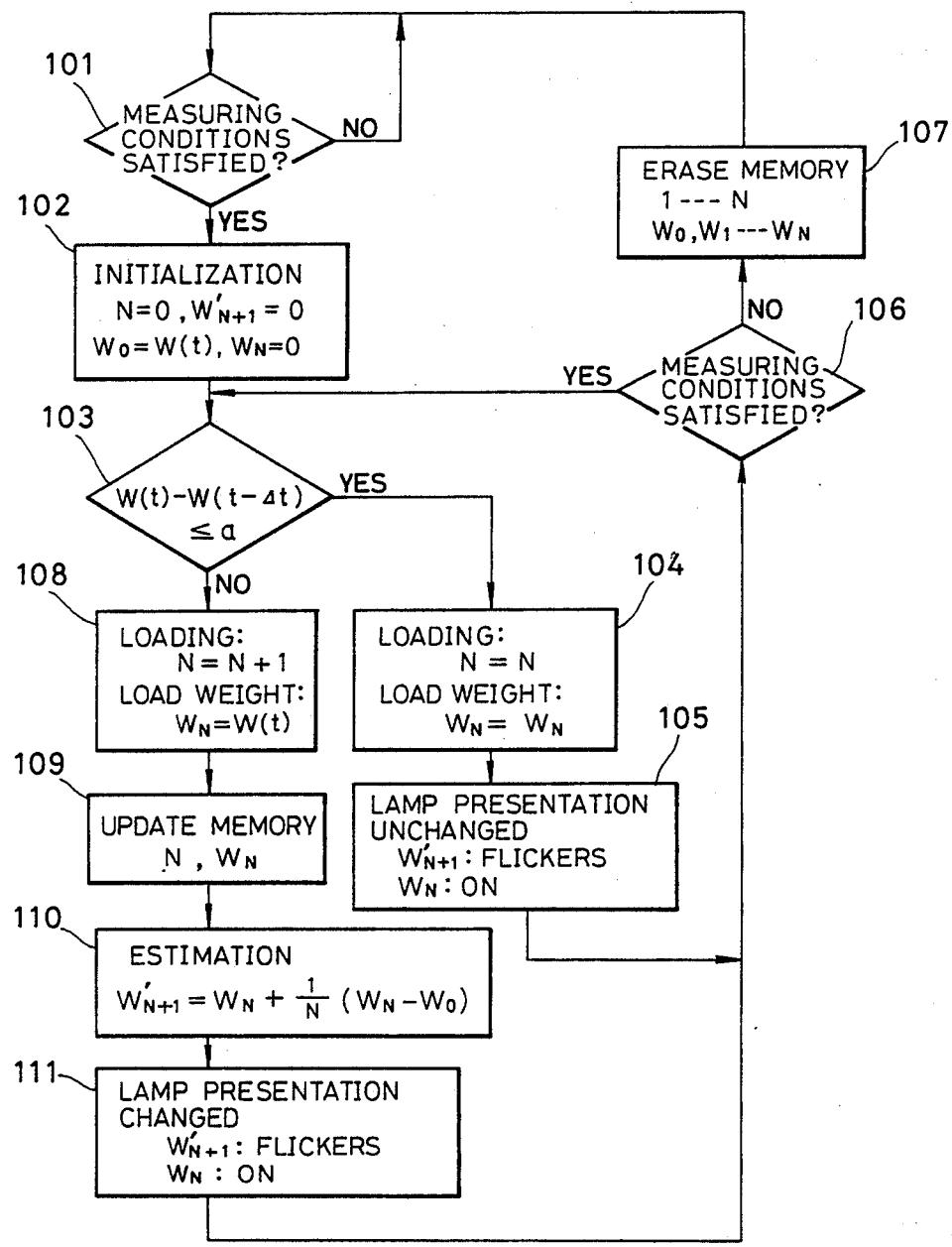
FIG. 4 is a flowchart illustrating an example of calculations to be carried out in an estimative calculation section in the apparatus in accordance with the embodiment shown in FIG. 1.
Figure 5:
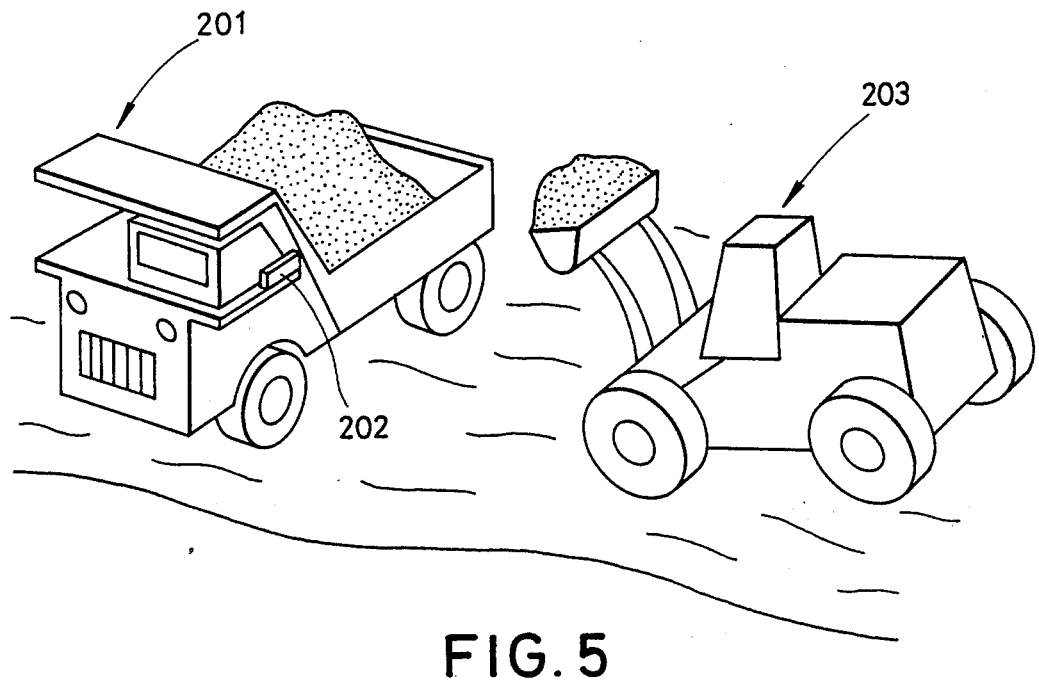
FIG. 5 is a perspective view illustrating a loading operation which is performed for a dump truck.
Figure 6:
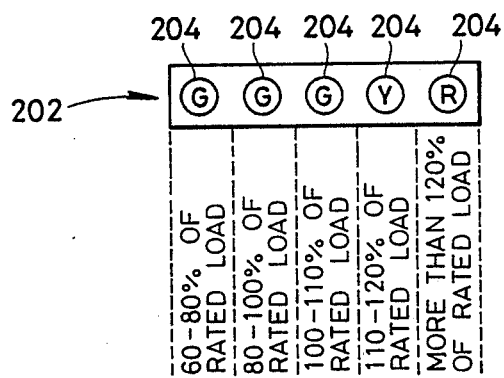
FIG. 6 is a fragmental view illustrating a manner of representing on a conventional display board for representing a quantity of load to be carried by the dump truck.

Next, description will be made below with reference to a flowchart in FIG. 4 as to another example of calculation to be carried out by the calculation section 21 as shown in FIG. 1.

First, the calculation section 21 makes a determination as to whether measuring conditions are satisfied or not (step 101). Namely, when it is found that a measurement starting switch (not shown) is turned on, a limit switch (not shown) for detecting that a vessel on the dump truck is lowered is turned on and a parking switch is turned on, the calculation section 21 makes a determination that the measuring conditions have been satisfied. In this case, the calculation section 21 performs a series of sampling operations at a suitable interval time $\Delta t$ for the load which has been measured using the load meter 1 and at least a load $W(t)$ and a load $W(t-\Delta t)$ are stored in the storing section 22 at every time when a sampling operation is performed. Then, initial values are set and stored in the storing section 22 on the assumption that the number N of loading operations is zero, a load $W'_{N+1}$ to be carried by the dump truck during a next loading operation is zero, an initial load $W_O$ is equal to $W(t)$ and a load $W_N$ to be carried thereby at this time is equal to $W_O$ (step 102).

Next, the calculation section 21 calculates a difference between the load $W(t)$ stored in the storing section 22 and the load $W(t-\Delta t)$ and it makes a determination as to whether a loading operation has been performed or not, based on the fact as to whether the foregoing difference is less than a present weight a or not (step 103). Since the initial setting has been effected just at the step 102, the difference represented by $W(t)-W(t-\Delta t)$ is equal to or less than a. Thus, the calculation section 21 makes a determination that no loading operation has been performed. For the reason, the calculation section 21 does not update the content stored in the storing section 22 on the assumption that the number N of loading operations is equal to N (=0) and the load $W_N$ to be carried by the dump truck at this time is equal to $W_N$ (=0) (step 104). Further, the calculating section 21 makes a determination that it does not change the content represented by the display board 24, based on the fact that no loading operation is performed (step 105). Thereafter, a determination is made in the same manner as at the step 101 as to whether measuring conditions are satisfied or not (step 106). When it is found that they are not satisfied, the calculation section 21 erases the content stored in the storing section 21 (step 107). Then, the process goes back to the step 101. However, when it is found that the measuring conditions are satisfied, the process goes back to the step 103.

In a case where a loading operation is performed in excess of the weight for a period of time $\Delta t$ till a sampling operation for the load to be carried by the dump truck during a next loading operation, since the difference represented by $W(t)-W(t-\Delta t)$ is not equal to or less than in this case, the calculation section 21 makes a determination that a loading operation has been performed (step 103). Then, the number N of loading operations is set equal to N+1 and the load $W_N$ to be carried by the dump truck is set equal to $W(t)$ (step 108), and the calculation section 21 updates the content stored in the storing section 22 (step 109).

Next, the calculation section 21 carries out a calculation by putting in the following formula (5) the number N of loading operations, the initial load $W_O$ and the load $W_N$ to be carried by the dump truck at this time each of which is stored in the storing section 22, so as to allow a load $W'_{N+1}$ to be carried thereby during a next loading operation to be estimated (step 110).

$$W'_{N+1} = W_N + \frac{1}{N}(W_N - W_O) \quad (5)$$

Further, the calculation section 21 makes a determination that it changes the content represented by the display board 24, based on the fact that a loading operation has been performed (step 111), and it transmits to the display driver 23 signals indicative of the load $W_N$ to be carried by the dump truck at this time and the estimated load $W'_{N+1}$ to be carried thereby during a next loading operation. When the display driver 23 has these signals inputted therein, the load $W_N$ to be carried thereby at this time and the load $W'_{N+1}$ to be carried thereby during a next loading operation are represented on the display board 24 in such a manner as shown in FIG. 3.

Further, processings to be executed after the step 103 are likewise repeated at every interval time $\Delta t$ so that the load $W_N$ to be carried by the dump truck at this time and the estimated load $W'_{N+1}$ to be carried thereby during a next loading operation are represented on the display board 24.

Incidentally, in the aforementioned embodiment, the load $W_N$ to be carried by the dump truck at this time and the estimated load $W'_{N+1}$ to be carried thereby during a next loading operation are represented by allowing the respective lamps on the display board 24 to be turned off, turned on/off and turned on. However, the present invention should not be limited only to this. Alternatively, the load $W_N$ to be carried thereby at this time and the estimated load $W'_{N+1}$ may be represented, e.g., in a digital fashion.

While the present invention has been described above with respect to a single preferred embodiment, it should of course be understood that it should not be limited only to it but various changes or modifications may be made in a suitable manner without departure from the spirit and scope the invention as defined by the appended claims.

What is claimed is:

1. An apparatus for representing a load to be carried by a dump truck for which representing is effected on the basis of said load which has been measured by a load meter of the type mounted on said dump truck, wherein said apparatus comprises;
   calculating means for calculating the number of loading operations by addition at every time when said load is stepwise increased so as to allow a load to be carried by the dump truck during a next loading operation to be estimated with reference to the number of loading operations and the load which has been loaded on the dump truck till now, and
   representing means for representing an estimative load to be carried by the dump truck, said estimative load being calculated by said calculating means.

2. The apparatus as claimed in claim 1, wherein said calculating means is such that a steady value indicative of a load to be carried by the dump truck is measured on the basis of variation of said load, a determination is made such that the load is stepwise increased, on the basis of a difference between a steady value before a single loading operation and another steady value after the same, and the number of loading operations is calculated by addition at every time when the load is stepwise increased.

3. The apparatus as claimed in claim 2, wherein a determination is made such that a single loading operation has been performed, when it is found that a difference between a steady value before said single loading operation and another steady value after the same is in excess of a preset value.

4. The apparatus as claimed in claim 3, wherein said calculating means is such that a difference between a steady value before a single loading operation and another steady value after the same is calculated as a value indicative of a load to be carried by the dump truck during said single loading operation, an average load to be carried thereby is calculated by dividing a sum of respective loaded weights corresponding to the number of loading operations by the latter, and a load to be carried by the dump truck during a next loading operation is estimated by adding said average load to the carried load which has been loaded on the dump truck.

5. The apparatus as claimed in claim 2, wherein said calculating means is such that a difference between a steady value before a single loading operation and another steady value after the same is calculated as a value indicative of a load to be carried by the dump truck during said single loading operation, an average load to be carried thereby is calculated by dividing a sum of respective loaded weights corresponding to the number of loading operations by the latter, and a load to be carried by the dump truck during a next loading operation is estimated by adding said average load to the carried load which has been loaded on the dump truck.

6. The apparatus as claimed in claim 1, wherein said calculating means is such that it makes a determination that a quantity of load is stepwise increased, on the basis of a difference between a load for which sampling operations are performed at every preset time interval and another load for which a sampling operation is performed just before said determination and the load which has been loaded on the dump truck is then calculated by multiplying a quantity of stepwise increased load by the number of loading operations.

7. The apparatus as claimed in claim 6, wherein a determination is made such that a single loading operation has been performed when it is found that a difference between a load for which sampling operations are performed at every preset time interval and another load for which a sampling operation is performed just before said determination.

8. The apparatus as claimed in claim 7, wherein said calculating means is such that a difference derived from a subtraction of a load for which a sampling operation is performed at the time when a loading operation is started from another load for which a sampling operation is performed at this time is calculated and a quotient derived from a division of said difference by the number of loading operations is added to said load for which a sampling operation is performed at this time so that a load to be carried by the dump truck during a next loading operation is estimated.

9. The apparatus as claimed in claim 6, wherein said calculating means is such that a difference derived from a subtraction of a load for which a sampling operation is performed at the time when a loading operation is started from another load for which a sampling operation is performed at this time is calculated and a quotient derived from a division of said difference by the number of loading operations is added to said load for which a sampling operation is performed at this time so that a load to be carried by the dump truck during a next loading operation is estimated.

* * * * *